United States Patent Office 3,259,495
Patented July 5, 1966

3,259,495
PHOTOTHERMOGRAPHIC DATA PROCESSING COMPOSITION, METHOD AND ARTICLE
Herbert N. Schlein, Framingham, Mass., assignor to Itek Corporation, Lexington, Mass., a corporation of Delaware
No Drawing. Filed Apr. 5, 1962, Ser. No. 185,242
20 Claims. (Cl. 96—29)

This invention relates to improved data-processing compositions and to a method for stabilizing said compositions after development. More particularly, this invention relates to photothermographic compositions having enhanced developability, comprising mercurous or silver oxalate admixed with oxalates of insoluble divalent diamagnetic metals. The invention also relates to the method of preparing and using the composition and to photographic media in which the composition may be used, as well as to novel methods for stabilizing the image on the print so that it will be permanent.

By "enhanced developability" is meant increased responsivity to heat during development of the image following its exposure to light, so that for a given light energy input, a denser image is obtained or alternatively less light energy is required to obtain an equivalent density. In analogy to silver halide photography, it might be said that the ASA number of the composition has been raised.

Mercurous and silver oxalates have long been known as photographically sensitive compounds. For example, U.S. Patent No. 1,976,302, which issued in 1934, covered the use of these compounds for making photographic images. As described in the patent, the mechanism involved includes an initial inoculation of the substance with nuclei of unspecified composition, by exposure to light. These nuclei then subsequently catalyze the thermal decomposition of the oxalate, upon application of heat, to develop the latent image. While the compositions are useful for direct or contact photography, their responsivity to heat development and their instability made their use extremely limited.

Since the issuance of that patent, many related discoveries and improvements have been made, mostly directed to enhancement of the developability of the mercurous and silver oxalates.

In one instance, a polyhydroxy alcohol was added to reduce the required temperature from a value of about 125° C. to about 75° C. Nevertheless, other undesirable characteristics persisted, such as image volatility and instability.

According to a subsequent discovery, patented in 1953 as U.S. Patent No. 2,637,657, the addition of minor amounts of mercurous and/or silver oxalates to heavy metal salts, such as lead formate, results in some enhancement in the thermal developability of the heavy metal salt. In essence, however, this is a reverse approach, for the mercury or silver oxalate is actually used to supplement the developability of the heavy metal salts. Furthermore, the time needed for development is still too long for practical commercial usage.

In a detailed study, reported in Photographic Engineering, volume 4, No. 2 (1953), P. A. van der Meulen and R. C. Countryman disclosed that the developability of mercurous oxalate was affected by a variety of factors. It was observed that an excess of oxalate ions, up to 13%, increased the developability. Furthermore, when a pH of 5.5 or above was utilized, thermal decomposition of the mercurous oxalate occurred more readily. In addition, the manner of precipitation of the mercurous oxalate also affected its developability. Brief mention was made of the use of dyes to increase sensitization, but this involves a shift in the spectral response range and is not truly related to the enhancement of developability. Thus, even with the addition of dyes to shift the wave length sensitivity, the response to heat was still too small.

In another instance, as disclosed in Patent No. 2,700,- 610, and in the Journal of Physical Chemistry, volume 57, pp. 437–439 (April 1953), a co-precipitated mixture of mercurous and silver oxalate was claimed to exhibit higher photothermal sensitivity than the separate components alone. However, the stability and speed of development was still too limited for practical use.

A further discovery by Professor van der Meulen and his associates, reported in Photographic Science and Engineering, volume 3, No. 5 (September–October 1959), and in Patent No. 2,933,389, revealed that the visible sensitization of mercurous oxalate could be enhanced by the addition of mercurous or silver iodides. However, this did not result in reduced development time of the compounds.

Hence, even with all this activity, the speed of development of mercurous or silver oxalate has still been insufficient and the compounds have not been practical for commercial use.

Accordingly, an object of this invention is to provide a novel oxalate-type photothermographic composition for use in a dry process photographic system.

Another object is to provide means for incorporating stabilizing materials in the composition.

Another object is to provide means for fixing or stabilizing the photothermographic composition.

Another object is to provide a method for making and using the photothermographic composition.

Another object is to provide a photothermographic composition of the above character having increased thermal responsivity. A more specific object is to provide a photothermographic composition of the above character having capabilities which makes it practical for commercial use.

Still another object is to provide a photothermographic composition which not only has increased thermal responsivity for image development, but also provides enhanced light sensitivity in the visible range of the spectrum.

Another object is to provide a photothermographic composition of the above character having improved resistance to image volatility.

Another object is to provide a photothermographic composition which can be used with either an anhydrous binder or with emulsion bases currently used in the trade to coat a substrate.

Another object is to provide a novel photographic medium of low cost and which is easy to manufacture.

Another object is to provide a novel developing and fixing process for the photothermographic composition wherein the photographic image will be made permanent.

Other objects of the invention will in part be obvious and will in part appear hereinafter.

The invention accordingly comprises the several steps and the relation of one or more of such steps with respect to each of the others, and the composition possessing the features, properties, and the relation of constituents, and the article incorporating said composition which are exemplified in the following detailed disclosure, and the scope of the invention will be indicated in the claims.

In general, I have found that when mercurous and/or silver oxalate are admixed with insoluble divalent diamagnetic oxalates, a synergistic enhancement of the developability of the mercury/or silver compound occurs. More particularly, when from 25 to 75 equivalent percent of a divalent diamagnetic oxalate salt, such as the oxalate salt of barium, calcium, uranium, strontium or chromium, is added to mercurous or silver oxalate or a mixture thereof, the time needed to develop the image is substantially reduced or equivalently less light exposure is needed to obtain an equivalent optical density. Oxalates of magnesium, thallium and copper, while not as effective as the above group, do permit a significant reduction in the amount of the mercurous or silver oxalate employed, without deleterious effect upon the image density. In contrast, the oxalate of trivalent iron a paramagnetic ion decreases the developability so that the mercurous and silver oxalate exhibit no thermal development in its presence.

The composition is preferably used in an anhydrous photographic system, although aqueous film forming systems, such as a gelatinous system may also be used. This involves emulsification of the oxalate composition in either a solution of cellulose acetate-butyrate or other resinous binder for the anhydrous system or in an aqueous solution of gelatin or other emulsifier. After homogenization, the solution is coated onto a substrate, such as a cellulose sheet, paper, cloth or a glass plate, and dried before use.

For certain methods of stabilization of the image produced from the photothermographic composition, either the coated base or the coating composition before application to the base is modified. In the first instance, the coated base is additionally coated with polyvinyl butyral or similar coating composition which becomes an ultra violet attenuator upon exposure to heat. In the latter instance, ferrous oxalate is added to the coating composition so that upon development, the ferrous ion is converted to the ferric ion, which inhibits further development of the oxalate composition and thereby effects stabilization of the image. A combination of the two techniques is also possible.

The coated plate or sheet, with or without the stabilization additives, is then briefly exposed to a source of actinic radiation, the exact time depending on the intensity. The radiation preferably has a wave length which includes a portion of the ultraviolet region of the spectrum. If a dye has been incorporated into the photothermographic composition, other wave lengths may be more desirable.

After light exposure, the sheet is developed by exposure to a temperature of about 150° to 350° F. An oven, a heated roll or a heated stylus may be used for this purpose.

Here, certain other methods may be used to stabilize the developed image if the pre-development methods described above were not used. The mercurous or silver oxalate is removed by transfer or washing or, after conversion to metallic mercury or silver, by transfer or volatilization. Each method is described in detail below under the subheading, "Stabilization of the Image."

Upon completion of the process, it is found that an image of good density is produced. The resolution ranges to several hundred lines per millimeter; and especially after fixing, the image is stable and has archival quality.

The invention will now be described in detail by reference to specific examples which disclose the procedure for preparing and then coating the oxalate composition onto a substrate, the manner of exposure and the technique for developing the coated substrate to produce a visible image, and several methods for stabilizing the image to a substantially permanent quality.

A. PREPARATION OF COMPOSITION AND BASE MEDIA

Example I

A solution of 4.8 parts by weight of $HgNO_3 \cdot H_2O$ and 4 parts $BaNO_3 \cdot 2H_2O$ in 90.2 parts of 0.3 N nitric acid was treated with 0.7 part of urea and added rapidly in the dark to 124 parts of 0.36 N potassium oxalate (25% excess). The mixture was then stirred for 10 minutes, after which it was passed through a homogenizer three times. The precipitate was allowed to settle and washed by decantation with distilled water until the wash was oxalate free.

The washed precipitate was then allowed to contact 50 parts of 2.0 N potassium oxalate for 2 hours, and subsequently it was dehydrated by 4 washings with acetone. Next it was added to a solution of 55 parts of half-second cellulose acetate-butyrate in 175 parts of acetone containing 16.5 parts of dioctyl phthalate as a plasticizer and then emulsified in a homogenizer. The resultant emulsion was coated on several substrates including sheets and webs of cellulose acetate and paper, and on glass plates.

Example II

A solution of 4.8 parts of $HgNO_3 \cdot H_2O$ and 4 parts $BaNO_3 \cdot 2H_2O$ in 90.2 parts of 0.3 N nitric acid was treated with 0.7 parts of urea and added rapidly to 124 parts of 0.36 N potassium oxalate (25% excess) in the dark and stirred for 10 minutes. The mixture was passed through a homogenizer three times. The precipitate was allowed to settle and washed by decantation with distilled water until the wash was oxalate free. The volume of the barium-mercurous oxalate and supernatant liquid was then adjusted to the original total volume. To this suspension was added 225 parts of a warm solution of gelatin (10% by weight) of iso-electric point less than 6.5 and 19 parts of 2 N potassium oxalate. The suspension was emulsified by two passes through a homogenizer. The resultant emulsion was used to coat glass plates and cellulose and paper sheets.

Example III

A mixed mercurous-silver precipitate was made in accordance with the above techniques including the forming of a solution using 2.5 parts of $HgNO_3 \cdot H_2O$, 1.5 parts of $AgNO_3$ and 3.9 parts of $BaNO_3 \cdot 2H_2O$ in 92 parts of 0.3 N nitric acid. The resultant solution was added in the dark to a 25% excess of 0.36 N potassium oxalate, homogenized, washed and admixed with gelatin or butyrate as above and then coated on various substrates.

Example IV

A solution of 4.8 parts of $HgNO_3 \cdot H_2O$ and 4 parts $BaNO_3 \cdot 2H_2O$ in 90.2 parts of 0.3 N nitric acid was treated with 0.7 parts of urea and added rapidly to 124 parts of 0.36 N potassium oxalate (25% excess) in the dark and stirred for 10 minutes. The mixture was passed through a homogenizer three times. The precipitate was allowed to settle and washed by decantation with distilled water until the wash was oxalate free. Prior to the final washing, 0.003 part of Acridine orange was added to the wash liquid for adsorption by the precipitate. Such inclusion of a dye shifts the wave length sensitization range of the photothermographic composition.

The volume of the barium-mercurous oxalate and supernatent liquid was then adjusted to the original total volume. To this suspension was added 225 parts of a warm solution of gelatin (10% by weight) of iso-electric point less than 6.5 and 19 parts of 2 N potassium oxalate. The suspension was then emulsified by two passed through a homogenizer. The resultant emulsion was used to coat glass plates and cellulose and paper sheets.

B. EXPOSURE AND DEVELOPMENT

Example V

Each composition in the above examples was used to coat a roll of paper. The paper was then exposed to a spot of light from a 100 watt Osram lamp with the emulsion side facing the light. The light is similar to that encountered in an oscillograph recorder. The exposure was equivalent to a paper speed of 5000"/minute at a spot speed of 3000 cycles/second. The paper was then developed by a 12 second passage over a heated roller maintained at 300° F. The image produced was clearly visible.

Example VI

Each of the above compositions was applied to several cellulose-acetate sheets. The emulsion side of each sheet, after drying, was placed against a printed translucent sheet and exposed to a 4 watt mercury fluorescent light in a direct process (contact print) for one second at a distance of 1 foot from the lamp. Each sheet was developed for 12 seconds in an oven kept at 300° F. A clearly visible reproduction of the printing was obtained. The resolution was greater than 100 lines per millimeter.

Example VII

Each composition in Examples I–III was applied to several glass slides on one side only. After drying, each of the coated sides was positioned against a printed paper sheet with a 40 wattsecond flash lamp disposed at a distance of 3 feet in a reflex copying arrangement. It was then exposed to one flash of the lamp (about 1 to 4 microseconds duration). Each slide was developed for 45 seconds by heat from an oven maintained at 248° F. An image of good resolution and contrast was produced in each case.

C. STABILIZATION OF THE IMAGE

Example VIII

This example illustrates a stabilization technique which is used prior to exposure and development. Thus, in a sense, it should follow Example IV and be considered a refinement or an additional step to the procedures of Examples I–IV.

Coated webs and sheets of Examples I, II, III or IV are additionally coated, prior to exposure to light and heat, with a 0.5 to 10 mil (preferably 2 mils) thickness of polyvinyl butyral. This added coating becomes an ultraviolet screen upon application of heat during development, so that the image will be stabilized.

After exposure and development, and upon test, it is found that the material has a photolytic rate (measured by darkening) of $1 \times 10^{-5}$ optical density units per second. In contrast, untreated material has a photolytic rate of $1 \times 10^{-3}$ optical density units per second under the same test conditions.

The photolytic rate of darkening of the treated material corresponds to a stability of 20 hours to a carbon arc; such as, found in an Atlas Fadeometer. It is evident that image stability has been attained.

Example IX

This example illustrates another pre-development stabilization technique and utilizes a method wherein subsequent development of the processed photocomposition is inhibited.

To the emulsion prepared as in Example II, there is added $FeC_2O_4 \cdot 2H_2O$ in a molar amount excessive to the soluble oxalates in the emulsion (3 parts, in this instance). The exposure and development are the same as described in Examples V to VII. By oxidation during the heating, the ferrous ion is converted to ferric ion, which inhibits subsequent thermal amplification of the photothermographic composition. As a comparison, in the presence of ferrous ion, the thermal amplification is 5,000–10,000. Since thermal amplification has been inhibited, considerable stabilization has therefore been achieved.

Example X

This example illustrates still another pre-development stabilization technique which utilizes a combined fixing method of Examples VIII and IX.

To the emulsion prepared as in Example IV, three parts of $FeC_2O_4 \cdot 2H_2O$ are added. The glass plates, cellulose and paper sheets are then coated with the emulsion.

After being dried, a coating of two mil thickness of polyvinyl butyral is applied to the coated dry web.

The web, when used as photographic material and then developed, is found to have excellent image stability.

Example XI

This stabilization technique is a post exposure and development step wherein the reacted photocomposition forms a "negative" which is stable. It can be considered as a transfer fixing method.

By the use of materials prepared either as in Example I, II or IV, a mercury image is formed after exposure and developing. The mercury of the image is caused to react by pressing a transfer sheet impregnated with either selenium sulfide or palladium chloride against the original sheet. Thus, wherever there is mercury on the original there will be a blackening of the transfer sheet.

The selenium sulfide impregnated transfer sheet is manufactured by first wetting the sheet with a 0.5% to a saturated aqueous solution of selenium oxide. The sheet is dried and then exposed to $H_2S$ to convert the oxide to selenium sulfide.

The palladium chloride impregnated transfer sheet is manufactured by wetting the sheet with a 2.25% to a saturated solution of palladium chloride.

Where the sheet has been exposed in a reflex process, this transfer will produce a right reading negative of the original material.

Example XII

This is another fixing method.

Prolonged heating (about 30 minutes) of the web prepared in Example I produces a direct positive due to volatilization of the mercury from the image areas. Mercury is left behind in the non-light struck areas by reason of a rate phenomenon, since it is formed more slowly there. This is a reversal, producing a direct positive image. The image can be stabilized by the transfer technique of Example XI.

Example XIII

This example illustrates a wet stabilization method for the mercury systems above.

The exposed and developed sheets of the examples above involving mercury as the photo element are dipped in a 0.1% to a saturated solution of NaCl (in this instance—2 minutes) and then washed with water and dried. This effects conversion of the unreacted oxalates to chlorides. The image then has good stability to the Fadeometer, the image being legible for at least 40 hours.

Example XIV

This example illustrates another wet stabilization method, wherein the unreacted $Hg_2C_2O_4$ and $Ag_2C_2O_4$ is removed from the developed sheet by washing.

The web of Example II, after exposure and development, is placed in a 35% formaldehyde solution for one minute to harden the gelatin. The web is then washed. Subsequently, it is dipped into either a 65% perchloric acid or a saturated zinc nitrate solution for 2–5 minutes to dissolve out the unreacted oxalates. The material is then washed and dried. Since the unreacted oxalates have been removed, a fixed, permanent, image is produced.

It should be evident from the foregoing examples that the developability of mercurous and silver oxalate has now been enhanced to a point where it can be used in commercial applications. Including the time for both exposure and development, only one minute, at most, elapses before the entire process including stabilization is complete. Furthermore, the reproduction can be on a completely dry basis if so desired, and thus no time-consuming drying steps are needed. The stabilization described above adds a high degree of image stability so that an excellent data storage medium is produced. Thus, the process is practical for use in office duplicating equipment.

With respect to variations in the photothermographic composition, the concentration ranges of the insoluble oxalate components preferably constitute the following equivalent percentage of the composition:

| | Percent |
|---|---|
| Barium | 25–75 |
| Calcium | 25–60 |
| Uranium | 25–50 |
| Strontium | 25–60 |
| Chromium | 25–60 |
| Magnesium | 25–40 |
| Thallium | 25–40 |
| Copper | 25–40 |

Concentrations of up to 75% in each instance are possible, but the higher limits in many instances are not as effective economically. Each component may be used individually or in admixture with one or several others.

The potassium oxalate component used during preparation of the composition is preferably in excess, varying from 0 to 3 times the equivalents of the metallic ions employed.

As to the coating composition, for gelatin or other emulsifier-gelatinizer, the preferred concentration is about 1 to 3% metal oxalate in a 2.5 to 7.5% solution of the gelatinizer. For butyrate, it is preferred to use about 1 part of metal oxalate ions with 2 to 12 parts of butyrate resin. Plasticizer, from 10 to 50% by weight of resin is incorporated into the dry butyrate resin before dissolution in a solvent.

If desired, the wave length sensitization of the composition can be altered by inclusion of dyes. Example IV illustrates a typical method for inclusion of a dye. Dyes that are useful are described in the Van der Meulen reference, Photographic Engineering, volume 4, No. 2 (1953). Other commonly used dyes in photographic work are also useful.

Variations in the process are also possible. The method of exposure, as illustrated in the examples, may be either direct, indirect or reflex.

The range of temperatures employed for heat development may be from about 150° F. to 350° F. and preferably from 200° F. to 300° F. Temperatures outside of this range are operable but the process requires much closer control at the higher temperatures or unduly long periods of development time at the lower temperatures.

It will thus be seen that the objects set forth above, among those made apparent from the preceding description, are efficiently attained, and, since certain changes may be made in carrying out the above process and in the composition set forth and in the article produced with said composition without departing from the scope of the invention, it is intended that all matter contained in the above description shall be interpreted as illustrative and not in a limiting sense.

Particularly, it is to be understood that in the claims, ingredients or compounds recited in the singular are intended to include compatible mixtures of such ingredients wherever the sense permits.

Having described my invention, what I claim as new and desire to secure by Letters Patent is:

1. A photothermographic composition for improved data recording by reason of amplified responsivity and sensitivity to certain wave lengths of light and to heat development, said composition comprising an admixture of at least one member of the group consisting of mercurous and silver oxalates, at least one member of the group consisting of the oxalate salts of barium, calcium, uranium, strontium, chromium, magnesium, thallium, and copper and a dye preselected for responsivity to said wave length of light.

2. A photothermographic composition for improved data recording by reason of amplified responsivity to heat development, said composition comprising an admixture of at least one member of the group consisting of mercurous and silver oxalates and at least one member of the group consisting of the oxalate salts of barium, calcium, uranium, strontium, chromium, magnesium, thallium, and copper.

3. A photothermographic composition for improved data recording by reason of amplified responsivity to heat development, said composition comprising an admixture of at least one member of the group consisting of mercurous and silver oxalates and from about 25 to 75 equivalent percent of at least one member of the group consisting of the oxalate salts of barium, calcium, uranium, strontium, chromium, magnesium, thallium and copper.

4. A photothermographic composition for improved data recording by reason of amplified responsivity to heat development, said composition comprising an admixture of barium oxalate and at least one member of the group consisting of mercurous and silver oxalates.

5. A photothermographic composition for improved data recording by reason of amplified responsivity to heat development, said composition comprising an admixture of calcium oxalate and at least one member of the group consisting of mercurous and silver oxalates.

6. A photothermographic composition for improved data recording by reason of amplified responsivity to heat development, said composition comprising an admixture of uranyl oxalate and at least one member of the group consisting of mercurous and silver oxalates.

7. A photothermographic composition for improved data recording by reason of amplified responsivity to heat development, said composition comprising an admixture of strontium oxalate and at least one member of the group consisting of mercurous and silver oxalates.

8. A dry thermally developable photographic medium comprising a substrate coated on at least one side with a composition comprising an admixture of at least one member of the group consisting of mercurous and silver oxalates, at least one member of the group consisting of the oxalate salts of barium, calcium, uranium, strontium, chromium, magnesium, thallium and copper and a dye preselected for responsivity to a certain wavelength of light.

9. A dry thermally developable photographic medium comprising a substrate coated on at least one side with a composition comprising an admixture of at least one member of the group consisting of mercurous and silver oxalates and at least one member of the group consisting of the oxalate salts of barium, calcium, uranium, strontium, chromium, magnesium, thallium and copper.

10. A dry thermally developable photographic medium comprising a substrate coated on at least one side with a cellulose acetate-butyrate coating composition which contains an admixture of at least one member of the group consisting of mercurous and silver oxalates and at least one member of the group consisting of the oxalate salts of barium, calcium, uranium, strontium, chromium, magnesium, thallium, and copper.

11. A dry thermally developable photographic medium comprising a substrate coated on at least one side with a gelatin-based coating composition which contains an admixture of at least one member of the group consisting of mercurous and silver oxalates and at least one member of the group consisting of the oxalate salts of barium, calcium, uranium, strontium, chromium, magnesium, thallium and copper.

12. A method for recording data having excellent image stability comprising exposing a photographic medium consisting of a substrate coated on at least one side with two superimposed layers, the inner layer adjacent the substrate comprising a composition of an admixture of at least one member of the group consisting of mercurous and silver oxalates and at least one member of the group consisting of the oxalate salts of barium, calcium, uranium, strontium, chromium, magnesium, thallium and copper and the outer layer comprising a coating composition which becomes less transparent to ultraviolet light upon application of heat, to a source of light modified by the data to be recorded and later developing the latent image produced thereby on said substrate by exposure to heat of a temperature between about 180° to about 350° F.

13. A method for recording data having excellent image stability comprising exposing a photographic medium consisting of a substrate coated on at least one side with a composition of an admixture of at least one member of the group consisting of mercurous and silver oxalates and at least one member of the group consisting of the oxalate salts of barium, calcium, uranium, strontium, chromium, magnesium, thallium and copper to a source of light modified by the data to be recorded, later developing the latent image produced thereby on said substrate by exposure to heat of a temperature between about 180° to about 350° F. and fixing the image thereon by dipping said coated substrate into a solution of one member of the group consisting of perchloric acid and zinc nitrate to dissolve out the unreacted oxalates whereby a substantially permanent image will be obtained.

14. A method for recording data having excellent image stability comprising exposing a photographic medium consisting of a substrate coated on at least one side with a composition of at least one member of the group consisting of mercurous and silver oxalates admixed with a molar excess amount of ferrous oxalate to a source of light modified by the data to be recorded, and later developing the latent image produced thereby on said substrate by exposure to heat of a temperature between about 180° to about 350° F.

15. A method for recording data having excellent image stability comprising exposing a photographic medium consisting of a substrate coated on at least one side with two superimposed layers, the inner layer adjacent the substrate comprising a composition of at least one member of the group consisting of mercurous and silver oxalates admixed with a molar excessive amount of ferrous oxalate and the outer layer comprising a coating composition which becomes opaque to ultraviolet light upon application of heat, to a source of light modified by the data to be recorded, and later developing the latent image produced thereby on said substrate by exposure to heat of a temperature between about 180° to about 350° F.

16. A method for recording data having excellent image stability comprising exposing a photographic medium consisting of a substrate coated on at least one side with a composition of at least one member of the group consisting of mercurous and silver oxalates to a source of light modified by the data to be recorded, later developing the latent image produced thereby on said substrate by exposure to heat of a temperature between about 180° to about 350° F. and contacting said medium with a transfer sheet impregnated with at least one member of the class consisting of selenium sulfide and palladium chloride whereby said developed image is transferred to said transfer sheet.

17. A method for recording data having excellent image stability comprising exposing a photographic medium consisting of a substrate coated on at least one side with a composition containing mercurous oxalate to a source of light modified by the data to be recorded, later developing the latent image produced thereby on said substrate by exposure to heat of a temperature between about 180° to about 350° F., and fixing said image by immersing said medium into a salt solution comprising chloride ions, said solution containing from about 0.1% to a saturation percent of salt for from 30 seconds to 2 hours to thereby convert the unreacted oxalate to chloride, washing said chloride from said medium and then drying said medium.

18. A method for producing a stable developed image formed on a substrate with a coating of a photothermographic composition including at least one member of the group consisting of mercurous and silver oxalate comprising admixing a molar excess amount of ferrous oxalate to said photothermographic composition prior to its use in coating said substrate.

19. A method for fixing a developed image formed on a substrate with a coating of a photothermographic composition including at least one member of the group consisting of mercurous and silver oxalate comprising application of a transfer sheet impregnated with at least one member of the class consisting of selenium sulfide and palladium chloride to said coating to effect removal of the metal of said first group to the transfer sheet and subsequently removing said transfer sheet to produce a stable image.

20. A method for fixing a developed image formed on a substrate with a coating of a photothermographic composition containing mercurous oxalate comprising immersing said coated substrate into a salt solution comprising chloride ions, said solution containing from about 0.1% to a saturation percent of salt for from 30 seconds to 2 hours to convert the unreacted oxalate to chloride, washing said chloride from said substrate and then drying said substrate.

References Cited by the Examiner

UNITED STATES PATENTS

| 1,976,302 | 10/1934 | Sheppard et al. | 96—63 |
|---|---|---|---|
| 2,425,363 | 8/1947 | Crabtree et al. | 96—61 |
| 2,630,444 | 3/1953 | Fugassi et al. | 260—430 |
| 2,700,610 | 1/1955 | Suchow et al. | 96—88 |
| 2,732,304 | 1/1956 | Vanselow et al. | 96—94 |
| 2,873,289 | 2/1959 | MacKellar | 260—431 |
| 2,933,389 | 4/1960 | Meulen | 96—94 |

OTHER REFERENCES

Day et al.: Theoretical Inorganic Chemistry, 1962, Reinhold Publishing Corp., New York, pp. 300–301.

NORMAN G. TORCHIN, *Primary Examiner.*

A. D. RICCI, *Assistant Examiner.*